(12) United States Patent  (10) Patent No.: US 8,131,254 B2
Newman  (45) Date of Patent: Mar. 6, 2012

(54) METHOD OF CONVERTING A CELL PHONE INTO AN INTERNET CAMERA PHONE AND SYSTEM EMPLOYING SAID CAMERA PHONE

(76) Inventor: Charles Newman, Ann Arbor, MI (US)

( * ) Notice: Subject to any disclaimer, the term of this patent is extended or adjusted under 35 U.S.C. 154(b) by 212 days.

(21) Appl. No.: 12/645,061

(22) Filed: Dec. 22, 2009

(65) Prior Publication Data

US 2010/0167784 A1  Jul. 1, 2010

Related U.S. Application Data

(60) Provisional application No. 61/139,886, filed on Dec. 22, 2008.

(51) Int. Cl.
*H04W 88/02* (2009.01)

(52) U.S. Cl. .................................................... 455/404.1

(58) Field of Classification Search ............... 455/404.1, 455/556.1; 715/760; 340/3.71; 348/211.2, 348/14.2
See application file for complete search history.

(56) References Cited

U.S. PATENT DOCUMENTS 5,267,042 A   11/1993   Tsuchiya et al.
6,965,398 B2  11/2005   Arakt
(Continued)

*Primary Examiner* — Diane Mizrahi
(74) *Attorney, Agent, or Firm* — Gifford, Krass, Sprinkle, Anderson & Citkowski, P.C.

(57) ABSTRACT

A cell phone is converted into a limited use camera. The camera is formed by removing the circuit board of a used, discarded cell phone; reprogramming the firmware memory of the cell phone to conform it to the intended camera use; and repackaging the cell phone in a functionally appropriate housing. The reprogrammed camera phone has the capability of transmitting a picture, via the Internet, to a website where the pictures can be viewed and downloaded for printing.

4 Claims, 2 Drawing Sheets

U.S. PATENT DOCUMENTS

| | | |
|---|---|---|
| 7,096,038 B1 | 8/2006 | Perrella |
| 7,129,986 B2 | 10/2006 | Wang et al. |
| 7,196,805 B1 | 3/2007 | Toebes et al. |
| 7,349,532 B2 | 3/2008 | Henderson |
| 7,428,005 B2 | 9/2008 | Creamer et al. |
| 2006/0029296 A1* | 2/2006 | King et al. .................... 382/313 |
| 2008/0019569 A1* | 1/2008 | Rhoads et al. ................ 382/107 |
| 2008/0219658 A1 | 9/2008 | Keane et al. |

* cited by examiner

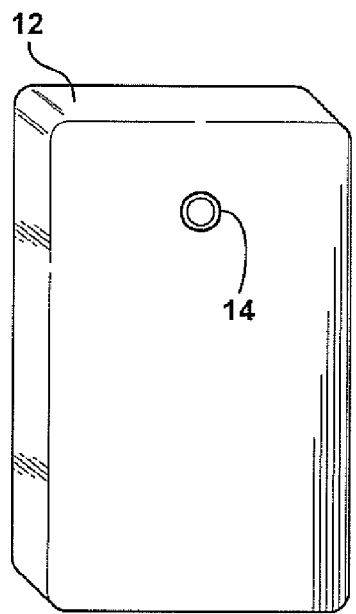
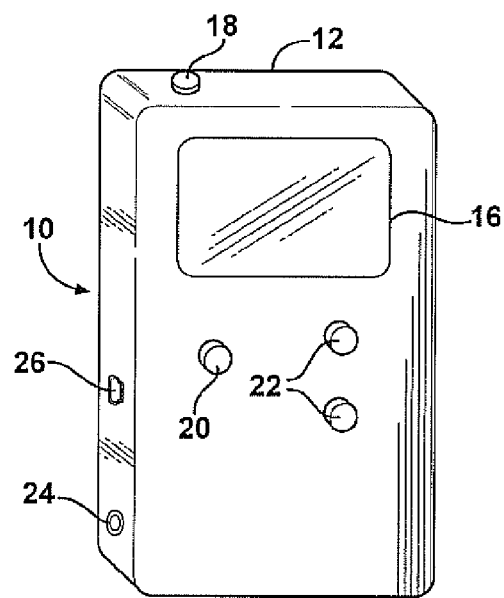
FIG. 1  FIG. 2
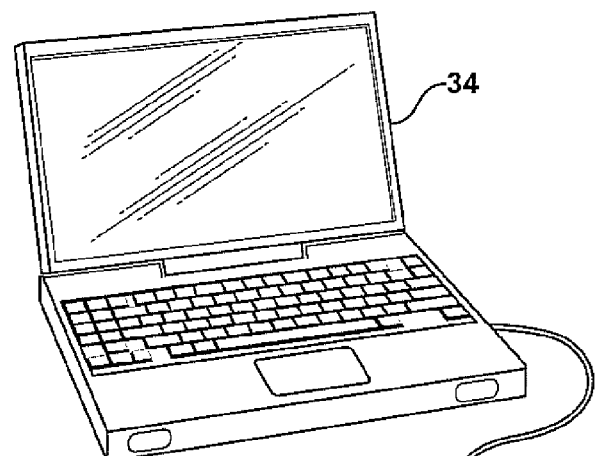
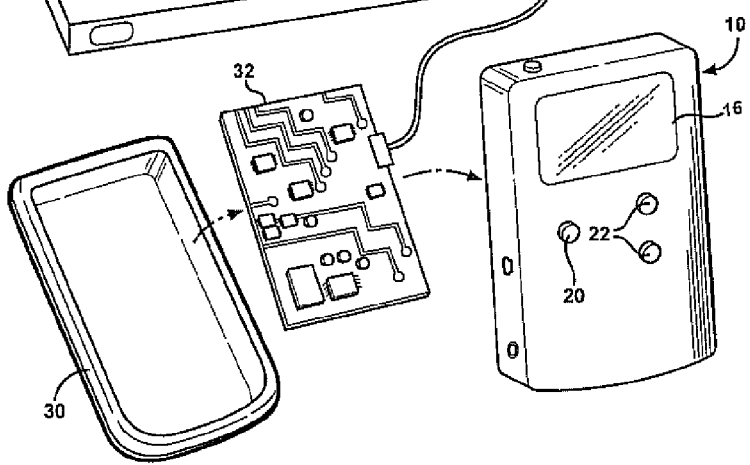
FIG. 3

METHOD OF CONVERTING A CELL PHONE INTO AN INTERNET CAMERA PHONE AND SYSTEM EMPLOYING SAID CAMERA PHONE

CROSS-REFERENCE TO RELATED APPLICATIONS

This application claims the benefit of U.S. Provisional Application 61/139,886 filed on Dec. 22, 2008.

FIELD OF THE INVENTION

This invention relates to camera phones and more particularly to a unique camera phone solely used for taking photographs and storing and transmitting them to locations for viewing as well as to a method of making such camera phones from discarded cell phones.

BACKGROUND OF THE INVENTION

Because of the rapid technological evolution of cell phones in recent years as well as the practice of American cell phone carriers to subsidize the consumer's purchase of new cell phones in exchange for contractual commitments to use the carrier's services for limited periods of time, and to subsidize the exchange of old cell phones for new cell phones at the renewal of those contracts, cell phones typically have a service life of only a few years before they are discarded. While a number of business entities are engaged in the business of collecting discarded cell phones for such purposes as refurbishment for resale at low prices or donations to the needy, a large number of cell phones are simply disassembled for selection of precious metals or the like or are discarded in landfills and the like.

In recent years the large majority of such phones have incorporated cameras which allow the user to take photographs which may be downloaded to computers or the like for viewing or printed.

In view of the still large percentage of cell phones which are discarded, overburdening landfills and the like, it would be desirable to provide alternative uses for such phones.

SUMMARY OF THE INVENTION

The present invention is therefore accordingly directed toward specialized camera phones which are only useful for taking photographs and transmitting them to a utilization device using the communication alternatives associated with cell phones. These camera phones are roughly constructed from discarded and otherwise economically useless cell phones by removing the interior electronics from the discarded cell phone's housing, reprogramming the memories associated with the operating systems for the cell phones to allow them to accomplish the modified functions of the camera phone, and inserting them in unique camera phone housings equipped with only those controls necessary for the limited camera phone functions.

These camera phone functions largely comprise the capability of viewing and then capturing an image, storing that image in cell phone memory, viewing the captured image to determine whether it is worthwhile preserving and transmitting the preserved images to another device either at the execution of a switching function by the user or at a preprogrammed time when specially economical transmission rates may apply, such as in very early morning hours.

The transmissions are preferably via a cellular network and the Internet to a server associated with a website which allows the party producing the photographs to view them in a high-definition manner and cause them to be retransmitted to some other device or location for printing or preservation if so desired. Alternatively, the captured photographs may be transmitted by cable to the USB port of a local PC, or through a WiFi or Bluetooth type transmitter if such are included in the salvaged electronics. The WiFi protocol might be used to transmit the photographs over the Internet to a server using the voice-over-Internet protocol which is extremely low in cost.

As a business proposition, the telephones may be sold at a very low cost with the capability of only recording and preserving a limited number of photographs such as 25. For an additional charge the ability of the camera phone to capture and store an additional quantity of photographs could be purchased. The entire cost of the camera phone or a large part of the charge which would otherwise be made to a consumer might be avoided by transmission of the photographs to a website which derives income by selling prints of the photographs through advertising.

BRIEF DESCRIPTION OF THE DRAWINGS

Other objects, advantages and applications of the present invention will be made apparent by the following detailed description of preferred embodiments of the invention. The description makes reference to the accompanying drawings in which:

FIG. 1 is a front perspective view of a preferred embodiment of a unique camera phone formed in accordance with the present invention;

FIG. 2 is a rear view of the camera phone of FIG. 1;

FIG. 3 is a schematic diagram illustrating the process of converting the electronics of a discarded cell phone into an appropriate form for use in the camera phone and inserting the converted electronics in the camera phone housing.

DETAILED DESCRIPTION OF THE PREFERRED EMBODIMENTS

Figure 4:
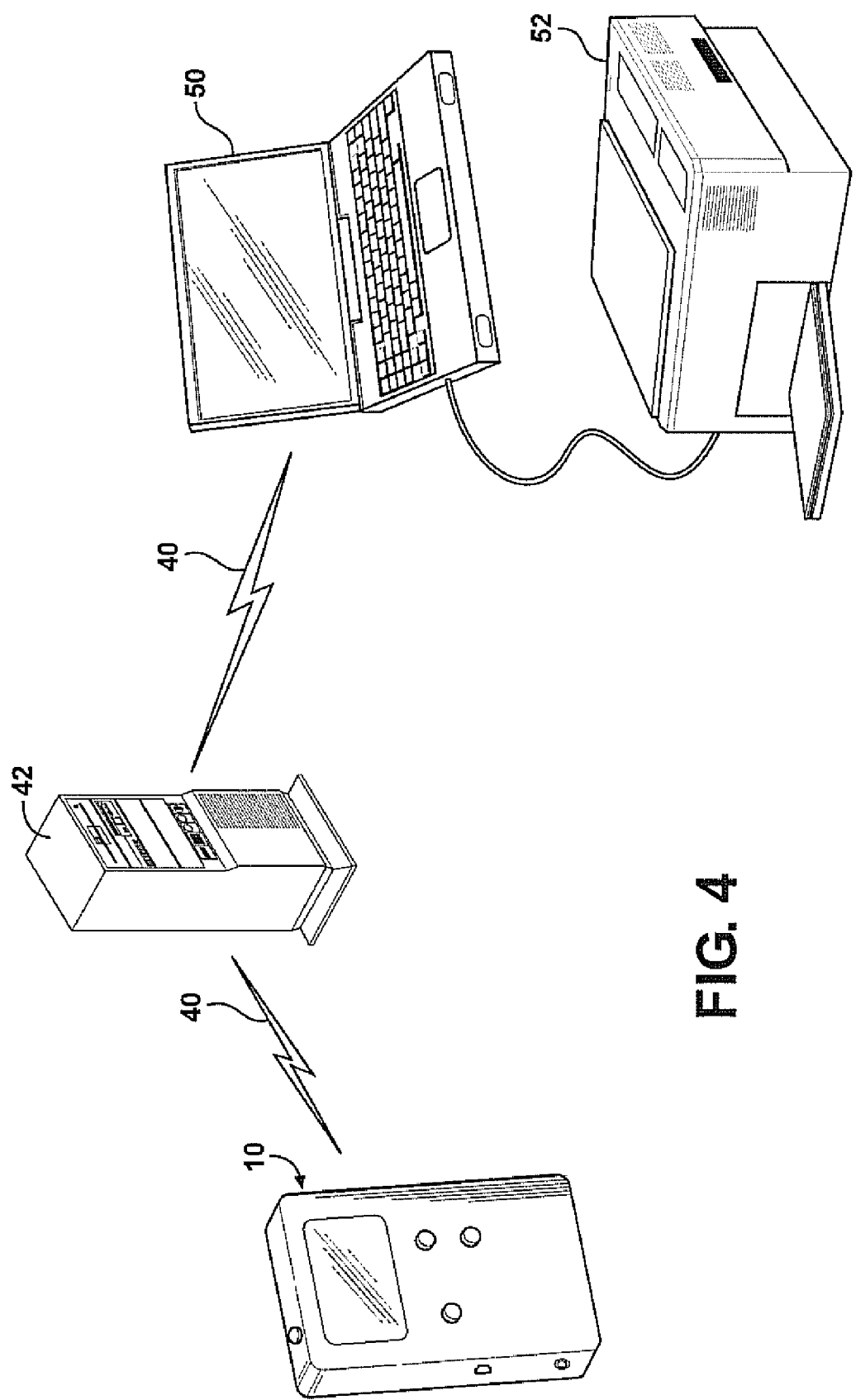
FIG. 4 is a schematic diagram illustrating the method of transmission of a photograph from a converted camera phone to a website where it may be viewed by the user and may be transmitted to another device, such as a computer and printer combination, for printing.

The camera phone of the present invention, generally indicated at 10, has very limited functions compared to a cell phone and particularly a "smart phone" and has the resulting simple appearance illustrated in FIGS. 1 and 2. FIG. 1 is a front view of the camera phone housing 12 illustrating the camera lens 14 disposed in the center of the front. The rear view of the camera phone 10, illustrated in FIG. 2, shows a viewing screen 16, preferably constituting a liquid crystal display (LCD); a shutter-actuating button 18, located on the top of the housing 12 near one end; an on/off switch 20; and switches 22 for viewing captured photographs and making decisions to retain or discard them.

One edge of the camera phone contains a connector 24 for a power cord for the purpose of charging the cell phone battery and a universal serial bus (USB) port 26 which allows the camera phone to be connected to associated electronics, such as a PC or printer through a cable (not shown).

The method of forming the camera phone 10 is illustrated in schematic form in FIG. 3. The housing 30 of a discarded cell phone is used to create the camera phone 10. The majority of the electronics within the cell phone housing 30 are supported on a circuit board 32. The electronics include such items as the microprocessor, its associated memories and firmware, the camera electronics, and a photoelectric imaging array which may be complementary metal oxide semiconductor (CMOS) or charged coupled device (CCD). This circuit board 32, and any connected parts required for the camera phone such as the LCD, are removed from the housing during the disassembly process. The circuit board 32 is then coupled to a reprogramming computer 34 by a cable 36. The reprogramming computer goes through a routine which erases the existing firmware, which might be electrically erasable programmable read-only memory (EEPROM) or the like, and substitutes a program which will enable the functions of the camera phone 10.

This program will necessarily be unique to the underlying model of cell phone 30. The generation of the reprogramming software for the computer 34 is straightforward in implementation and design but is relatively expensive. This makes it advantageous to select a model of cell phone 30 which represents a large population of the discarded cell phones available. There is no economic justification for developing the unique reprogramming application for a brand of cell phone which represents only a small percentage of those available for conversion. Additionally, over time the relative populations of different models of cell phones within the discarded cell phones available will change and it will be necessary to change the programs employed in the computer 34 to reprogram the circuit boards 32 of the discarded cell phones to create the appropriate circuit board for the camera phone application 10.

As a final step, the reprogrammed circuit board 32 and attach parts such as the LCD are inserted in the camera phone housing 10 and the relatively few connections are made between the reprogrammed circuit board 32 and the controls of the camera phone such as the switches 20 and 22. The LCD 16 of the cell phone is arranged so it is visible through a complementary window on the rear of the camera phone housing.

One manner in which the camera phone 10 may transmit captured photographs to remote locations is illustrated schematically in FIG. 4. The circuit board 32 will contain enabling electronics for what was previously the cell phone's cellular connection and, after conversion, has become the camera phone 10's cell phone connection. The cell phone 10 is preferably programmed to make cell phone to Internet transmissions of the captured photographs stored in its memory at particular times when cell phone rates are low such as in the early morning hours. The proprietor of the camera phone system may negotiate special tariffs with the cell phone carriers to further reduce the cost of such transmissions.

Since the circuit board 32 includes a clock, the camera phone 10 may transmit pictures at such predetermined time through the Internet 40 to a remote server 42. The server is associated with a website which allows the user of the camera phone 10 to view pictures transmitted from the camera phone 10 at any time. Through commands transmitted by a user's PC to the website supported by the server 42, the user may enter commands which allow selected photographs to be transmitted through the Internet 42 to the user's personal computer 50 or any other computer. A printer 52 connected to the computer 50 can then be used to print out the photographs. The computer 50 might be associated with an enterprise maintaining very high-quality printers which could then be mailed to the user.

The camera phone 10, if it includes an alternative communication transceiver, such as Bluetooth, Wi-Fi, or the like, may use that communication method to transmit one or more photographs to either the server 42 or to a computer such as 50. If a Wi-Fi connection is used, the voice-over-Internet protocol may be used to transmit the photographs at an extremely low cost. The camera phone 10 might also be directly cabled to a computer or printer using USB port 26.

The business method aspect of the present invention might involve sale or even giveaway of a camera phone 10 to a user, with a built-in capability to store and transmit a limited number of photographs, such as 25 or the like. The unit 10 might be programmed to limit its communication to the use of a cellular phone to couple to the Internet 40 and deliver the data representing the photographs solely to the server 42. Additional funds to the purveyor of the camera phone could be derived from activities at the server 42, such as charges for downloading photographs or for printing quality photographs and causing them to be mailed or otherwise delivered to the user, or simply from advertising charges on the Internet.

To the extent that the cell phone 30 from which the circuit board 32 is derived contained a geographical positioning system chip (GPS) the data transmitted to the server 42 with the photograph might include that location and/or the time at which the photograph was taken as indicated by the internal clock on the circuit board 32. That information could then be imprinted on the finished photograph. The server might include map software which could derive the geographic location of the place of taking of the photograph from the GPS data transmitted with the photograph so that instead of imprinting the photograph with the latitude and longitude, it could print it with the location, i.e. New York City, Paris, Cairo, etc.

Having thus disclosed my invention I claim:

1. The method of manufacturing a camera phone which comprises:
    a housing, a camera within the housing comprising a digital photo-optic array and a lens for imaging a subject on the array, a memory for storage of digital images recorded on the array, a firmware memory providing an operating system for the camera phone, and a cellular transmitter operative to transmit digital images stored in said memory, said method comprising:
    removing the components of a used cell phone having a camera function from the used cell phone housing;
    reprogramming the firmware memory of the used cell phone to enable the camera phone cellular transmitter to transmit digital images stored in the memory to only a single predetermined Internet address of a website, the website including the ability to generate graphical image displays based on the digital images transmitted to the predetermined Internet address by the camera phone; and
    disposing the reprogrammed circuit board in a new housing.

2. The camera phone of claim 1 wherein the camera phone further comprises a GPS chip connected to the memory so as to store a GPS signal indicating the location of the camera phone at the time a digital image is stored in memory.

3. The cell phone system of claim 1 wherein the digital photo-optic imaging array constitutes a CMOS array.

4. The cell phone system of claim 1 wherein the digital photo-optic imaging array constitutes a CCD array.

* * * * *